US012679121B2

(12) United States Patent
Saito et al.

(10) Patent No.: US 12,679,121 B2
(45) Date of Patent: Jul. 14, 2026

(54) PRINTING APPARATUS

(71) Applicant: SEIKO EPSON CORPORATION, Tokyo (JP)

(72) Inventors: Yusuke Saito, Yamagata-mura (JP); Masaki Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 125 days.

(21) Appl. No.: 18/439,089

(22) Filed: Feb. 12, 2024

(65) Prior Publication Data

US 2024/0270000 A1 Aug. 15, 2024

(30) Foreign Application Priority Data

Feb. 14, 2023 (JP) ................................ 2023-020588

(51) Int. Cl.
*B41J 25/00* (2006.01)
*B41J 11/22* (2006.01)
*B41J 25/308* (2006.01)

(52) U.S. Cl.
CPC ............ *B41J 25/001* (2013.01); *B41J 11/22* (2013.01); *B41J 25/308* (2013.01); *B41J 25/3082* (2013.01)

(58) Field of Classification Search
CPC ................................................... B41J 25/3082
See application file for complete search history.

(56) References Cited

U.S. PATENT DOCUMENTS

2003/0030684 A1* 2/2003 Ahn ....................... B41J 25/308 347/8
2005/0002714 A1* 1/2005 Tsuji ...................... B41J 23/025 400/59

FOREIGN PATENT DOCUMENTS

JP 2015-085552 A 5/2015

* cited by examiner

*Primary Examiner* — Shelby L Fidler
(74) *Attorney, Agent, or Firm* — WORKMAN NYDEGGER

(57) ABSTRACT

A printing apparatus includes a conveyance belt that supports a medium, a carriage where a printing head is disposed for printing on a medium, and a gap adjusting unit that adjusts the gap between the conveyance belt and the printing head. The gap adjusting unit includes a gap adjusting motor, a power transmission unit including a rotation shaft that rotates with the driving force of the motor, a lifting unit, and a relative displacement mechanism. The lifting unit moves the carriage up and down with the rotational force of the rotation shaft transmitted by the power transmission unit. The relative displacement mechanism relatively displaces one of two members making up at least one of the power transmission unit or the lifting unit in the direction of allowing the upward displacement of the carriage with respect to the other that is in an operation stop state.

12 Claims, 7 Drawing Sheets

PRINTING APPARATUS

The present application is based on, and claims priority from JP Application Serial Number 2023-020588, filed Feb. 14, 2023, the disclosure of which is hereby incorporated by reference herein in its entirety.

BACKGROUND

1. Technical Field

The present disclosure relates to a printing apparatus including a carriage in which a printing head is disposed.

2. Related Art

For example, JP-A-2015-85552 discloses a printing apparatus including a supporting member (an example of a supporting part) that supports a medium such as a sheet and a carriage in which a liquid ejecting head (an example of a printing head) that performs printing on the medium is disposed. The carriage includes a main carriage, and a sub carriage that is assembled such that it is freely displaceable up and down with respect to the main carriage. The tip end of the output shaft of a distance adjustment motor (an example of a driving unit) is fixed to a pinion, and the teeth of the pinion are engaged with the teeth of a rack member on the sub carriage side. Since the rack member engaged with the pinion moves up and down along with the driving of the distance adjustment motor, the sub carriage moves up and down together with the rack member. The distance in the vertical direction between the nozzle formation surface of a liquid jet head (an example of a printing head) supported by the sub carriage and a support surface serving as a supporting member of the sheet at the support base can be adjusted through the driving of the distance adjustment motor.

In the printing apparatus disclosed in JP-A-2015-85552, it is necessary to maintain the sub carriage (carriage) against the own weight at a height position corresponding to the gap. For example, the height position of the sub carriage is maintained by providing a torque from the driving unit such as the distance adjustment motor, or the height position of the sub carriage is maintained by using a locking function such as a worm gear included in a power transmission unit for transmitting the power of the driving unit to a component of a lifting unit such as a pinion.

A foreign object such as a medium trapped for a jam occurred below the carriage generates a force pushing up the carriage, but since the force of maintaining the sub carriage at the height position corresponding to the gap is working, the carriage cannot escape upward, which disadvantageously causes damage to the printing head. In view of this, there is a need for a printing apparatus in which the carriage can escape upward when a force pushing up the carriage is generated due to a hit of the printing head against the foreign object and the like even with the force of maintaining the carriage at the height position corresponding to the gap.

SUMMARY

A printing apparatus for solving the above-described problems includes a supporting part configured to support a medium, a carriage in which a printing head configured to perform printing on the medium supported by the supporting part is disposed, and a gap adjusting unit configured to adjust a gap between the supporting part and the printing head. The gap adjusting unit includes a driving unit, a power transmission unit including a rotation shaft configured to rotate with a driving force of the driving unit, a lifting unit configured to move the carriage up and down with a rotational force of the rotation shaft transmitted by the power transmission unit, and a relative displacement mechanism configured to relatively displace one of two members in a direction of allowing an upward displacement of the carriage with respect to the other of the two members that is in an operation stop state, the two members being members making up at least one of the power transmission unit or the lifting unit and making contact with each other.

DESCRIPTION OF EMBODIMENTS

Figure 1:
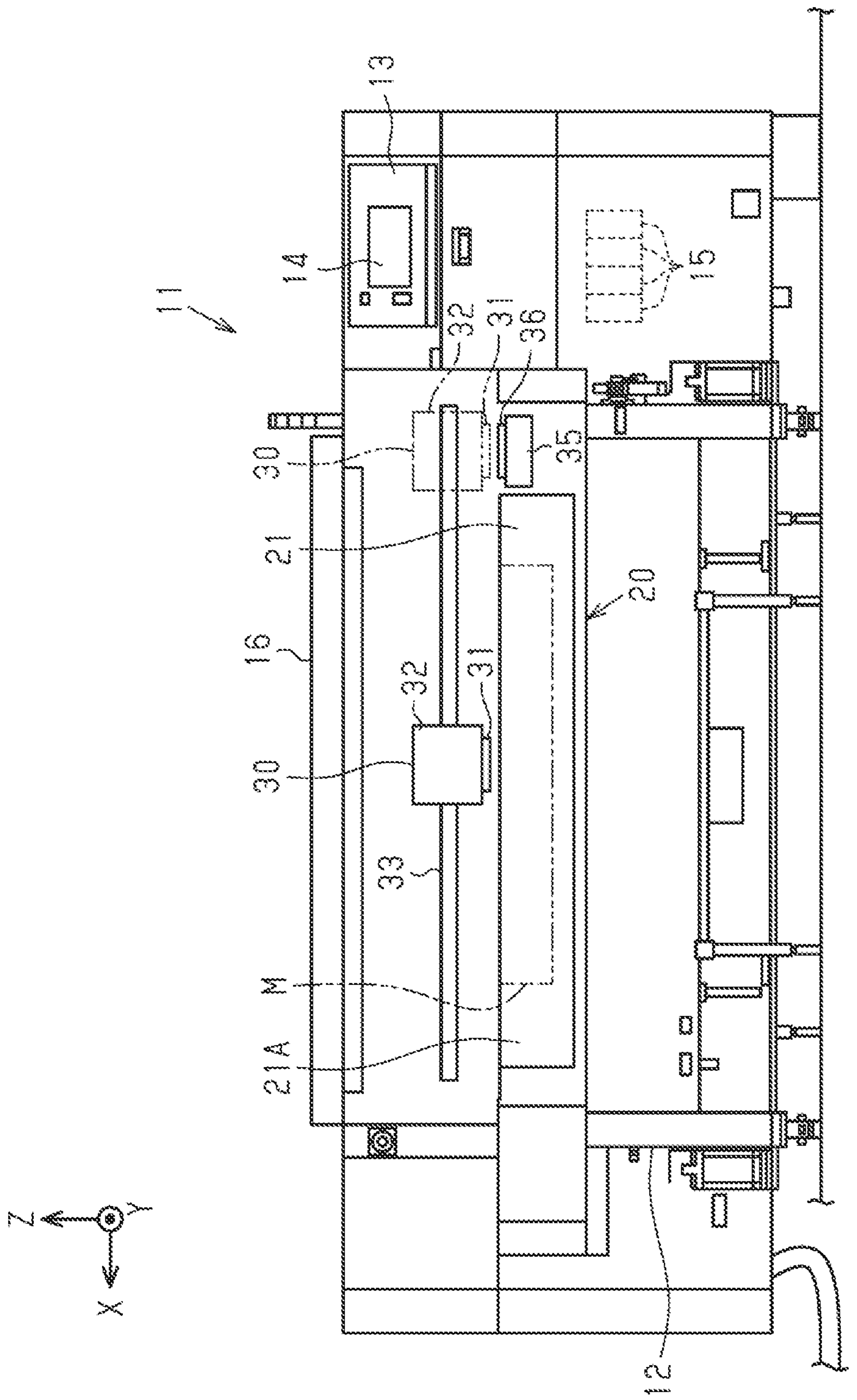
FIG. 1 is a front view illustrating a printing apparatus of an embodiment.

A printing apparatus 11 of an embodiment is described below with reference to the drawings. In the drawings, assuming that the printing apparatus 11 is placed on a horizontal plane, the direction parallel to the vertical direction is the Z axis, and the direction along the horizontal plane is the X axis and the Y axis. The X axis, the Y axis and the Z axis are orthogonal to each other. In the following description, the direction along the X axis is referred to also as width direction X, and the direction along the Y axis as conveyance direction Y, and the direction along the Z axis as vertical direction Z. The X axis is a virtual axis parallel to the width direction X of a conveyance belt 21 described later, and the Y axis is a virtual axis parallel to the conveyance direction Y of a medium M on the conveyance belt 21. Note that the width direction X is also the scanning direction in which a carriage 32 moves, and therefore referred to also as scanning direction X.

Configuration of Printing Apparatus 11

A configuration of the printing apparatus 11 is described with reference to FIGS. 1 and 2. As illustrated in FIG. 1, the printing apparatus 11 has a housing 12 with a column-and-beam structure. The printing apparatus 11 includes an operation unit 13. The operation unit 13 is an operation panel, for example. The operation unit 13 may include a display unit 14. The display unit 14 displays a menu screen, and information about the operation status of the printing apparatus 11. The display unit 14 also functions as a notification unit that provides the user with a notification of information about abnormalities occurred in the printing apparatus 11. The display unit 14 may be a touch-panel type display unit, for example. The operation unit 13 can provide an instruction to the printing apparatus 11 when operated by the user. In the case where the display unit 14 is a touch panel, a part of the operation unit 13 may be composed of its touch operation functional part. Note that the operation unit 13 may have a configuration with only an operation button.

As illustrated in FIG. 1, the printing apparatus 11 includes a conveyance unit 20 and a printing unit 30. The conveyance unit 20 includes the conveyance belt 21 for conveying the medium M. The conveyance belt 21 conveys the printing medium M (hereinafter referred to also simply as "medium M") such as fabric and sheet by supporting it at a surface 21A. In this embodiment, the conveyance belt 21 corresponds to an example of the supporting part that supports the medium M.

The printing unit 30 includes a printing head 31 and the carriage 32. The printing head 31 is disposed at the carriage 32. The printing head 31 performs printing on the medium M supported by the conveyance belt 21. The printing apparatus 11 includes a guide rail 33 that guides the carriage 32 in the scanning direction X. The carriage 32 moves back and forth in the scanning direction X along the guide rail 33. The printing head 31 prints images on the medium M while the carriage 32 moves. One end of the movement path of the carriage 32 is a standby position. During a non-printing state, the carriage 32 stands by at the standby position indicated by the chain double-dashed line in FIG. 1. A maintenance unit 35 is disposed at a position facing the printing head 31 located at the standby position. The maintenance unit 35 performs maintenance of the printing head 31. The maintenance unit 35 includes a cap 36. The cap 36 moves to a retreat position below the printing head 31, and a capping position where it makes contact with the printing head 31. The carriage 32 stands by under the capping state where the cap 36 makes contact with the printing head 31. In addition, the maintenance of the printing head 31 is performed under the capping state.

In addition, the printing apparatus 11 includes an ink supply source 15 that supplies ink to the printing unit 30. It is possible to provide a plurality of the ink supply sources 15, the same number as the number of colors of a plurality of color inks used for color printing. Each of the plurality of ink supply sources 15 contains ink of one color among the plurality of colors. The ink color includes cyan, magenta, yellow, black and the like, for example. The printing unit 30 performs printing of letters, images or the like on the medium M by ejecting the ink supplied from the ink supply source 15, from the nozzle (not illustrated) of the printing head 31 toward the medium M. Note that the ink supply source 15 is an ink cartridge or an ink tank, for example.

Specific Configurations of Conveyance Unit 20, Printing Unit 30, etc.

Next, specific configurations of the conveyance unit 20, the printing unit 30 and the like are described with reference to FIG. 2. As illustrated in FIG. 2, the conveyance unit 20 conveys the medium M with the conveyance belt 21. The printing unit 30 performs printing on the part of the medium M on the conveyance belt 21. The printing unit 30 and the like disposed above the conveyance belt 21 are covered with a cover 16. In addition, the printing apparatus 11 includes a control unit 100 that controls the conveyance unit 20 and the printing unit 30.

The printing unit 30 performs printing on the medium M supported by the conveyance belt 21 with the printing head 31. The printing head 31 of this embodiment performs printing on the medium M by ejecting liquid such as ink. Note that a portion facing the printing head 31 in the conveyance belt 21 is supported by a support base 27.

The conveyance unit 20 includes a conveyance unit 22 provided with the conveyance belt 21 in a rotatable manner. The conveyance unit 22 is provided in an upper part of the housing 12. The conveyance unit 22 includes the conveyance belt 21, a driving roller 23, a driven roller 24 and a conveyance motor 26. The driving roller 23 and the driven roller 24 have rotation axes along the X direction. The conveyance belt 21 is an elastic endless belt. The conveyance belt 21 is wound around the outer circumferences of the driving roller 23 and the driven roller 24. The conveyance motor 26 is a driving source of the driving roller 23. When the conveyance motor 26 is driven by the control unit 100, the drive and stop of the conveyance belt 21, and the conveyance speed during the driving are controlled.

The conveyance unit 22 rotates the endless conveyance belt 21 in a predetermined rotation path by driving the driving roller 23 into rotation. Further, the conveyance unit 22 can convey the medium M in the conveyance direction Y along with the rotation of the conveyance belt 21 with the rotation of the driving roller 23. The printing apparatus 11 includes a supplying unit (not illustrated) that supplies the medium M pasted to the conveyance belt 21. Note that the printing apparatus 11 is used together with a winding apparatus not illustrated in the drawing that winds up the medium M after the printing while peeling it from the conveyance belt 21.

The conveyance belt 21 includes an adhesive layer 25 on which the medium M can be pasted. Specifically, the conveyance belt 21 includes an endless belt base material 21B, and a single layer of the adhesive layer 25 formed on the outer peripheral surface of the belt base material 21B. The medium M is pasted on the surface 21A of the adhesive layer 25. The conveyance belt 21 can convey the medium M pasted on the adhesive layer 25 in the conveyance direction Y. The adhesive layer 25 has an adhesive property with which it can be temporarily pasted on other members and can be peeled off from the pasted state. Here, the adhesive layer 25 is available in a heat-sensitive type and a pressure-sensitive type. The adhesive layer 25 of heat-sensitive type has a property with which the adhesive force increases when the temperature increases. The adhesive layer 25 of pressure-sensitive type has a property with which the adhesive force increases when pressure is applied. In this embodiment the adhesive layer 25 of heat-sensitive type is described as an example while the adhesive layer 25 may be either the heat-sensitive type or the pressure-sensitive type.

As such, the conveyance unit 20 includes a heating unit 51 that heats the adhesive layer 25 of the conveyance belt 21, and a pressing part 52 that presses the medium M against the conveyance belt 21. The heating unit 51 includes a heater 51A serving as a heat source. The pressing part 52 includes a pressure roller 53 that rotates while exerting a pressure on the medium M.

Figure 2:
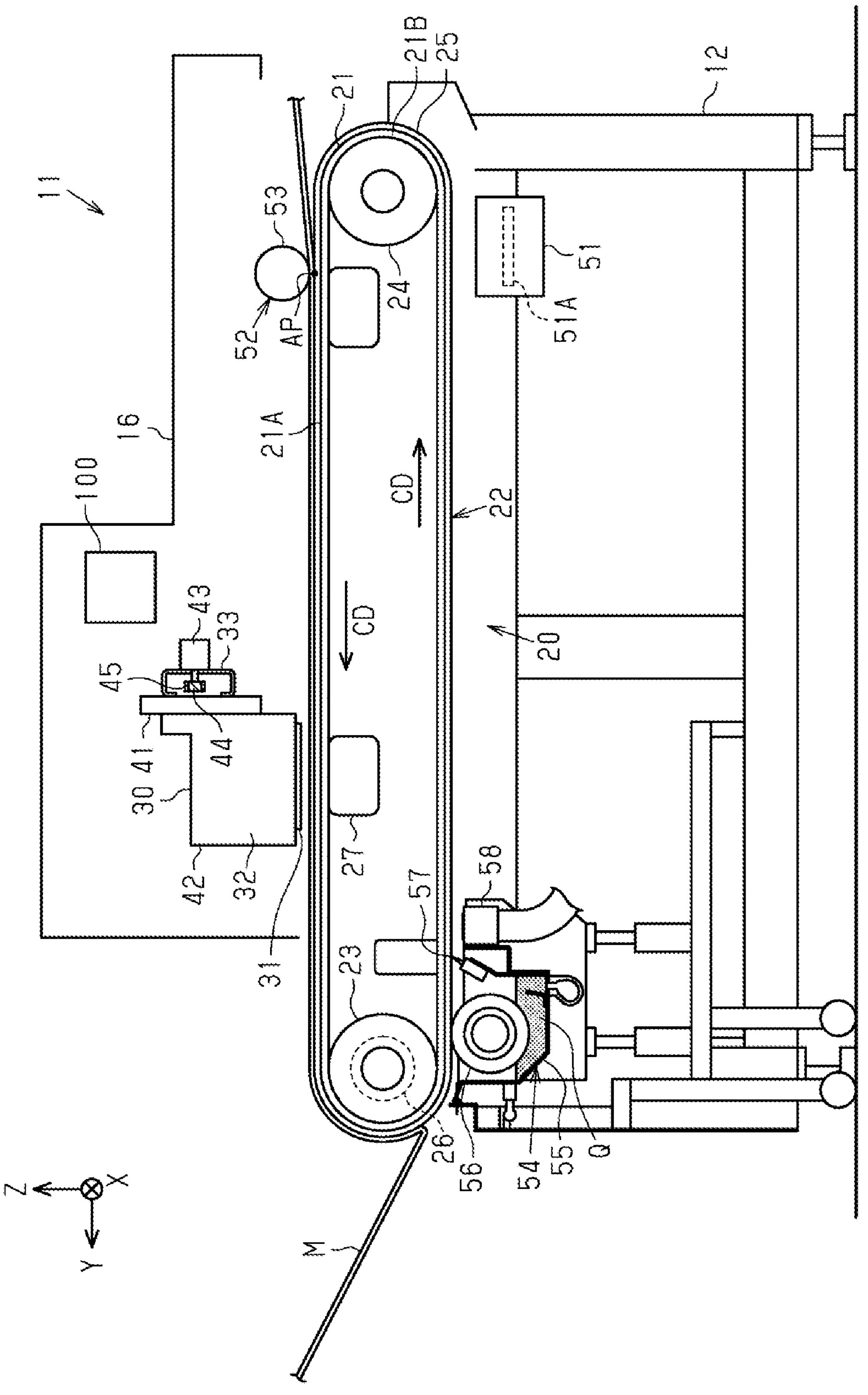
FIG. 2 is a schematic side sectional view illustrating a printing apparatus.

As illustrated in FIG. 2, the heating unit 51 heats the adhesive layer 25 at a position upstream of a pasting start position AP, where pasting of the medium M on the adhesive layer 25 is started, in a rotation direction CD.

The pressing part 52 is a mechanism that presses the medium M against the adhesive layer 25. The pressing part 52 moves back and forth in the +Y direction and −Y direction in a predetermined range in the Y-axis direction with the pressure roller 53 exerting a pressure on the medium M on the conveyance belt 21. The pressure roller 53 may be provided with a heater inside to press the medium M against the adhesive layer 25 while heating it.

As illustrated in FIG. 2, the printing unit 30 is located on +Z direction side of the conveyance unit 20. The printing unit 30 is configured to be able to perform printing on the medium M conveyed in the +Y direction. The printing unit 30 may be of serial printing type, or line printing type. In the case where the printing unit 30 is of serial printing type, the printing unit 30 includes the printing head 31, and the carriage 32 that supports the printing head 31 such that the printing head 31 is movable back and forth along the X direction. The printing head 31 is disposed on the +Z direction side with respect to the medium M, and performs printing on the medium M by ejecting ink as an example of liquid to the printed surface of the medium M. The printing head 31 is controlled by the control unit 100. The medium M having been subjected to printing is peeled off from the curved surface of the conveyance belt 21 with the force of a winding apparatus not illustrated in the drawing for winding up the medium M into a rolled form.

In addition, the printing apparatus 11 includes a cleaning unit 54 that cleans the conveyance belt 21. The cleaning unit 54 of this embodiment washes the surface 21A of the adhesive layer 25 with washing solution Q. The cleaning unit 54 includes a storage tank 55 that stores the washing solution Q, a brush 56, a squeegee 57 and a drying unit 58. The brush 56 cleans the surface 21A of the conveyance belt 21 with the washing solution Q. The squeegee 57 wipes the washing solution Q and the like from the surface 21A after the cleaning. The drying unit 58 blows air or hot air to dry the surface 21A.

The control unit 100 includes a CPU (Central Processing Unit) and a memory not illustrated in the drawing. The CPU is a computation processing device. The memory is a storage device that ensures the region for storing the program of the CPU, the working area and the like, and includes a memory element such as RAM (random access memory) and EEPROM (Electrically Erasable Programmable Read-Only Memory), a storage and the like. The CPU controls the operation of each unit of the printing apparatus 11 in accordance with the program stored in the memory. Specifically, the control unit 100 controls the conveyance unit 22, the printing unit 30, the heating unit 51, the pressing part 52, the cleaning unit 54, the drying unit 58 and the like.

Configurations of Carriage 32 and Its Surroundings

Figure 3:
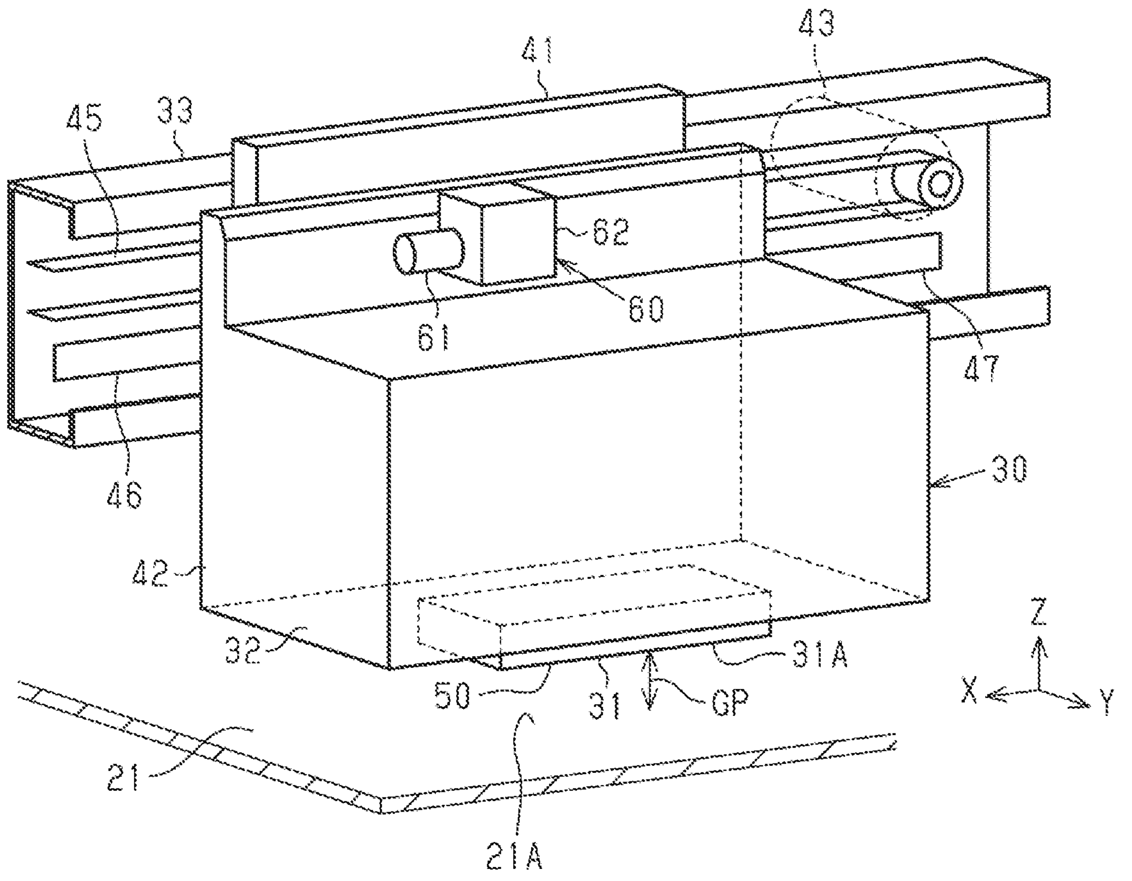
FIG. 3 is a perspective view illustrating a printing unit including a printing head and a carriage.

As illustrated in FIG. 3, the printing apparatus 11 includes the guide rail 33. The carriage 32 includes a carriage guide 41 configured to be movable in the scanning direction X with the guide of the guide rail 33, and a carriage body 42 held by the carriage guide 41 in a movable manner in the Z direction. The carriage guide 41 includes a pair of elevating rails (not illustrated). The carriage body 42 is elevatable with respect to the carriage guide 41 through the elevating rail.

A carriage motor 43 is attached at one end portion of the guide rail 33. A synchronous belt 45 is wound around a pulley 44 fixed to the output shaft of the carriage motor 43, and a pulley not illustrated in the drawing disposed at an end portion on the side opposite to the pulley 44 in the scanning direction X. The carriage guide 41 is fixed to a part of the endless synchronous belt 45 extended along the scanning direction X.

When the carriage motor 43 is driven forward/backward, the carriage 32 moves back and forth in the scanning direction X. The printing head 31 is disposed at a lower portion of the carriage 32. The printing head 31 includes a nozzle surface 31A at which the nozzle to eject ink opens. The nozzle surface 31A faces the medium M being conveyed.

The printing unit 30 includes a gap adjusting unit 60 that adjusts a gap GP between the conveyance belt 21 and the printing head 31. The gap adjusting unit 60 is attached at a position close to an upper portion on the back surface of the carriage 32. The gap adjusting unit 60 includes a gap adjusting motor 61 (hereinafter referred to also simply as "motor 61") as an example of the driving unit, and a power transmission unit 62 that transmits the power of the motor 61. With the power transmitted from the gap adjusting motor 61 through the power transmission unit 62, the carriage body 42 moves up and down along the carriage guide 41. In this manner, the gap GP is adjusted. The power transmission unit 62 is composed of a gear mechanism (gear line) including a gear group. Note that specific configurations of the gap adjusting unit 60 including the power transmission unit 62 are described later.

As illustrated in FIG. 3, the printing head 31 may be provided with a sensor 50 for detecting an upward force received from a foreign object when the nozzle surface 31A makes contact with the foreign object. The foreign object includes the medium M of a jam, and an object unintentionally present on the conveyance path. Examples of the latter object may be objects accidentally placed or dropped on the path of the carriage 32 when the user opens the cover for maintenance, such as when clearing a jam.

Normally, the carriage body 42 is held at a target height position where the gap GP adjusted by the gap adjusting unit 60 can be maintained so that it does not descend by its own weight. In some cases, the carriage body 42 is maintained at the target height position by using the torque of the motor 61, or the carriage body 42 is maintained at the target height position by utilizing the locking function of the power transmission unit 62. If the force or lock for holding the carriage body 42 at the target height position is working when the printing head 31 hits against the foreign object and the carriage body 42 receives a thrusting force during the printing, the carriage 32 cannot escape upward against the thrusting force. In this case, the printing head 31 receives a large impact force from the foreign object, which can easily cause damage to the printing head 31. In addition, at the power transmission unit 62, components such as gears may be damaged due to excessive thrusting forces.

In view of this, this embodiment employs a configuration in which the control unit 100 forcibly terminates the printing by stopping the moving carriage 32 when the sensor 50 detects a hit of the printing head 31 against the foreign object. This suppresses the damages to the printing head 31 and the power transmission unit 62 due to the thrusting force received from the foreign object due to a hit against the foreign object. However, as the speed of the carriage 32 increases, the frequency of failure to stop in time increases because of the increase of the travel distance between detection of a foreign object at the sensor 50 and stop of the carriage 32. In this case, the frequency of the failure of the damaged printing head 31 and the failure of the gap adjusting unit 60 increases.

For this reason, the gap adjusting unit 60 of this embodiment includes a relative displacement mechanism 90 that allows the carriage body 42 to escape upward when receiving the impact of a thrusting force even when the force of maintaining the carriage body 42 at the target height position is working. Note that the relative displacement mechanism 90 is elaborated later.

Configuration of Gap Adjusting Unit 60

Next, a configuration of the gap adjusting unit 60 is described with reference to FIGS. 4 and 5.

Figure 4:
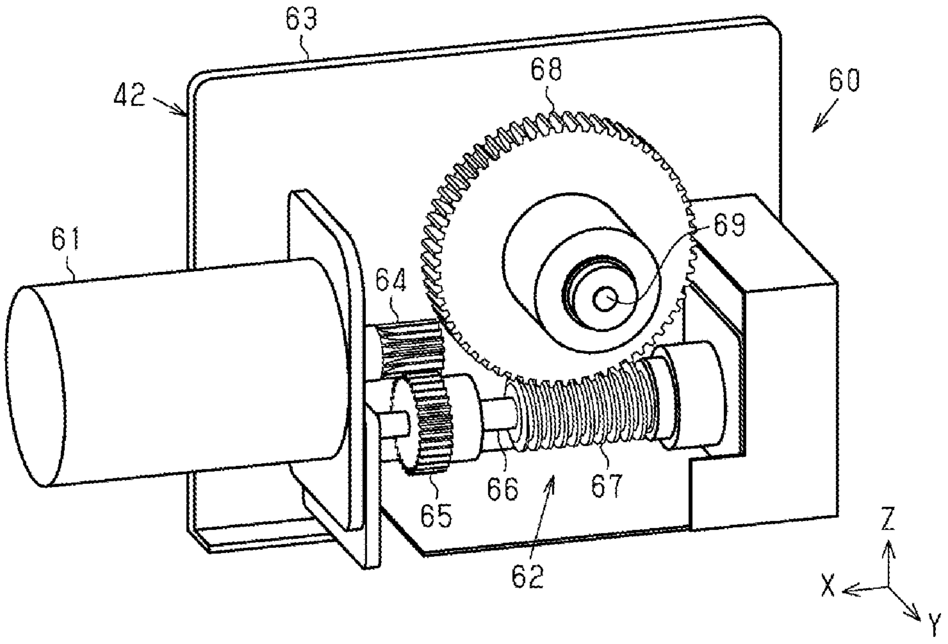
FIG. 4 is a perspective view illustrating a main part of a gap adjuster.

As illustrated in FIG. 4, the motor 61 and the power transmission unit 62 are assembled to a frame 63 making up the gap adjusting unit 60. The power transmission unit 62 includes a drive gear 64 attached to the output of the motor 61, a first gear 65 that engages with the drive gear 64, a worm gear 67 attached to a rotation shaft 66 common to the first gear 65, and a second gear 68 (worm wheel) that engages with the worm gear 67. The second gear 68 is attached to a second rotation shaft 69. The second rotation shaft 66 and the second rotation shaft 69 are orthogonal to each other. The rotation axis lines of the drive gear 64, the first gear 65 and the worm gear 67 are parallel to the scanning direction X, and the rotation axis line of the second gear 68 is parallel to the conveyance direction Y. In this manner, the power transmission unit 62 is a worm reducer including the worm gear 67.

Figure 5:
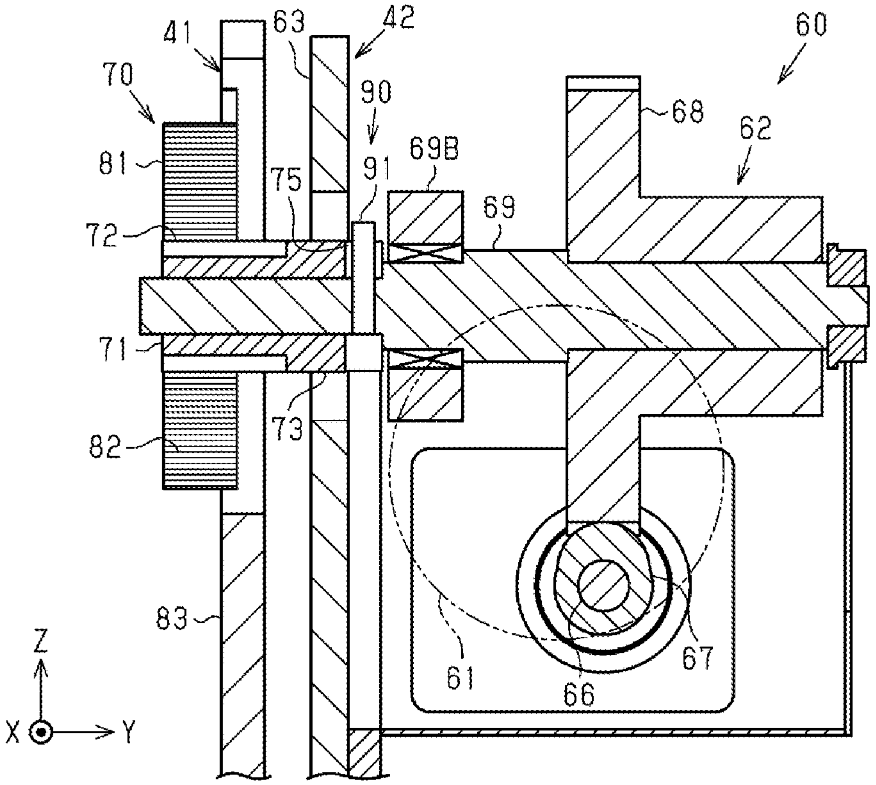
FIG. 5 is a side sectional view of a gap adjusting unit.
Figure 6:
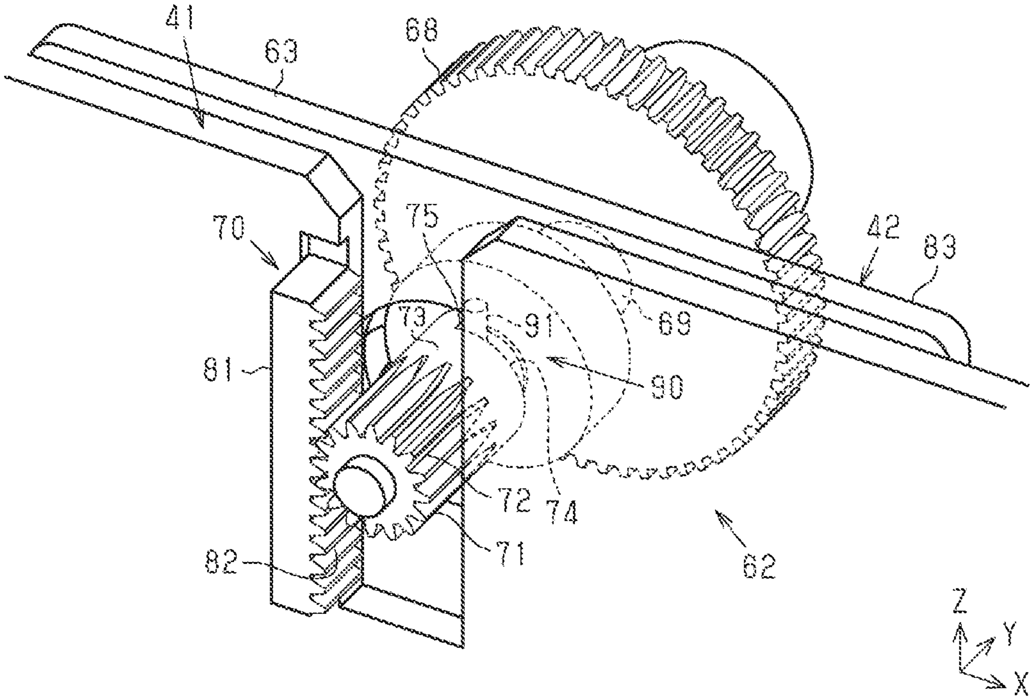
FIG. 6 is a perspective view illustrating a rack-and-pinion mechanism.

As illustrated in FIGS. 5 and 6, the gap adjusting unit 60 includes the power transmission unit 62 and a lifting unit 70. The lifting unit 70 inputs a rotation of the rotation shaft 69 transmitted from the motor 61 through the power transmission unit 62. The lifting unit 70 is coupled to a portion of the rotation shaft 69 protruding to the back side (the −Y side in the counter-conveyance direction) of the frame 63, and moves the carriage body 42 up and down with respect to the carriage guide 41 with the rotation of the rotation shaft 69. The lifting unit 70 is a rack-and-pinion mechanism, for example. The lifting unit 70 includes a pinion 71 and a rack 81. The pinion 71 is attached to the rotation shaft 69. The rack 81 is fixed to a guide frame 83 making up the carriage guide 41. Teeth 72 of the pinion 71 are engaged with teeth 82 of the rack 81. The rack 81 is fixed to the carriage guide 41 in an orientation in which the rotating pinion 71 can move in the vertical direction Z. Note that the second rotation shaft 69 is rotatably supported by a bearing 69B and the like.

When the motor 61 is driven forward, the pinion 71 rotates forward. The pinion 71 rotating forward moves up along the rack 81. As a result, the body of the carriage 32 moves up with respect to the carriage guide 41. On the other hand, when the motor 61 is driven backward, the pinion 71 rotates backward. The pinion 71 rotating backward moves down along the rack 81. As a result, the body of the carriage 32 moves down with respect to the carriage guide 41.

The worm gear 67 has a locking function for locking the rotation in one direction. The worm gear 67 of this embodiment is set such that the lock acts in the rotational direction in which the carriage body 42 moves down by its own weight. In this manner, after the gap is adjusted by the driving of the motor 61, the carriage body 42 can be maintained at the post-gap adjustment position even when the driving of the motor 61 is stopped. That is, it is not necessary to maintain the driving of the motor 61 to maintain the height position against the own weight of the carriage body 42 after the gap adjustment.

In this manner, the gap GP adjusted by the gap adjusting unit 60 is maintained by utilizing the locking function of the worm gear 67 so that the carriage body 42 does not descend by its own weight. However, if the lock is working when the printing head 31 receives a thrusting force from a foreign object when hit against the foreign object such as the medium M of a jam during the movement of the carriage 32, the carriage 32 cannot escape upward against the thrusting force. Consequently, the printing head 31 may be damaged by the impact force received from the foreign object.

In view of this, when the sensor 50 detects a foreign object, the control unit 100 stops the moving carriage 32. However, as the speed of the carriage 32 increases, the frequency of damage to the printing head 31 from large impact forces received from the foreign object increases due to the carriage 32 that does not stop in time. In view of this, the gap adjusting unit 60 of this embodiment includes the above-described relative displacement mechanism 90 that allows the carriage body 42 to escape upward when the carriage 32 receives a thrusting force even when the locking function of the worm gear 67 is working. The relative displacement mechanism 90 of this embodiment is an idling mechanism 90A for idling gears.

Configuration of Relative Displacement Mechanism 90

Next, a configuration of the relative displacement mechanism 90 is described with reference to FIGS. 5 to 7. As illustrated in FIG. 6, the relative displacement mechanism 90 is a mechanism that enables a relative displacement of one member with respect to the other of two members making up at least one of the power transmission unit 62 or the lifting unit 70 and making contact with each other when an external force of moving up the carriage 32 is applied. The relative displacement mechanism 90 may be a mechanism that idles or slides one of the two members with the other still set to an operation stop state.

The relative displacement mechanism 90 of this embodiment is the idling mechanism 90A that idles one of the two members. In this embodiment, the two members are the pinion 71 making up the lifting unit 70 and the rotation shaft 69 making up the power transmission unit 62. The idling mechanism 90A idles the pinion 71 with respect to the rotation shaft 69 in a rotation stop state. The relative displacement mechanism 90 is the idling mechanism 90A with which when an upward external force is applied to the carriage 32, the pinion 71 idles (relatively rotates) with respect to the rotation shaft 69 and the pinion 71 is allowed to displace upward through engagement with the rack 81. With the pinion 71 that is displaced upward through engagement with the rack 81, the carriage body 42 can escape upward when the printing head 31 receives a thrusting force from a foreign object.

As illustrated in FIGS. 5 and 6, the pinion 71 is supported at the tip end portion of the rotation shaft 69 on the downstream side of the power transmission path than the second gear 68 such that it is relatively rotatable with respect to the rotation shaft 69. The idling mechanism 90A idles the pinion 71 within a predetermined rotation angular range.

Specific Configuration of Idling Mechanism 90A

Next, a configuration of the idling mechanism 90A is described with reference to FIG. 7. As illustrated in FIG. 7, the idling mechanism 90A includes a pin 91 extending from the rotation shaft 69 in the radial direction, and the pinion 71 including regulation surfaces 75 and 76 that regulate the idling range with respect to the rotation shaft 69 by making contact with the pin 91. The pin 91 is fixed to the rotation shaft 69, and rotates along with the rotation of the rotation shaft 69.

The pinion 71 includes a recess 74 where a portion corresponding to the pin 91 is provided in a recessed manner in a semi-cylindrical shape at a base part 73 on the side opposite to the teeth 72 in the axis direction. The pinion 71 includes a semi-cylindrical protrusion 73A provided in a protruding manner at a portion corresponding to the semi-cylindrical recess 74 in the axis direction of the base part 73. The two regulation surfaces 75 and 76 are formed by the both end surfaces in the circumferential direction of the semi-cylindrical protrusion 73A. The pinion 71 is freely rotatable with respect to the rotation shaft 69, but the idling range of the pinion 71 is regulated to the range where the regulation surfaces 75 and 76 make contact with the pin 91. When one of the regulation surfaces 75 and 76 makes contact with the pin 91, further idling of the pinion 71 is regulated.

Figure 7:
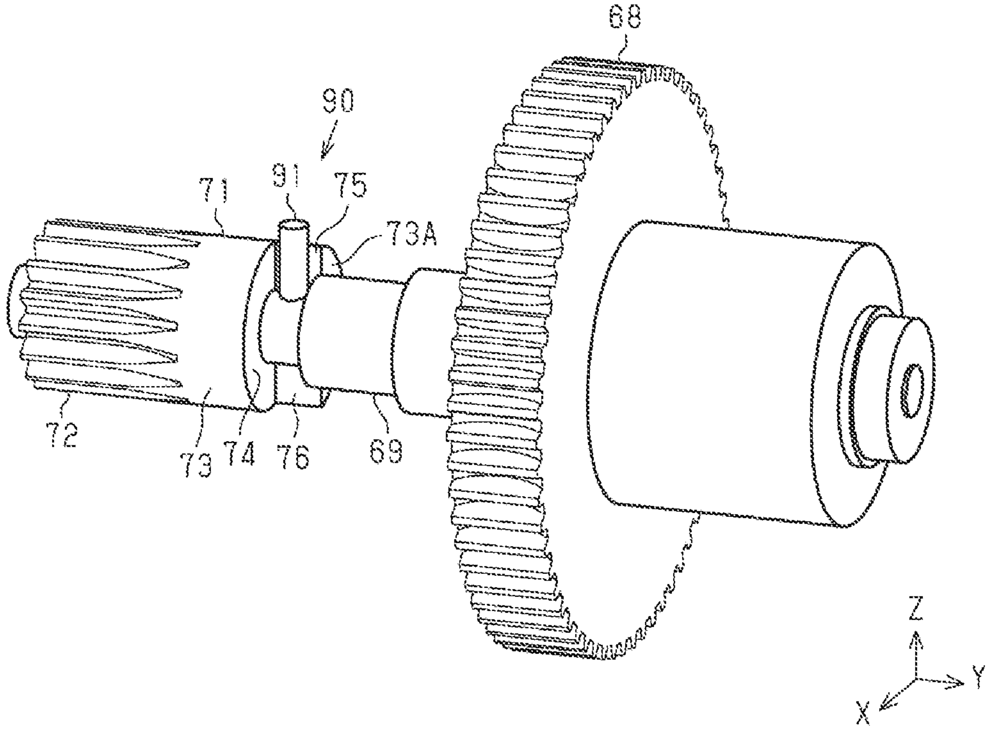
FIG. 7 is a perspective view illustrating a gear mechanism including an idling mechanism.

In the example illustrated in FIG. 7, the two regulation surfaces 75 and 76 are opposite to each other at approximately 180 degrees in the circumferential direction. Thus, the pinion 71 can idle within a range of approximately 180 degrees with respect to the rotation shaft 69. Specifically, the angular range θ over which the pinion 71 can idle is approximately 180 degrees. Note that the angular range θ over which the pinion 71 can idle is not limited to the range of approximately 180 degrees, and may be appropriately set within a range of $0° < θ < 360°$. The idling angular range θ may be any one of 30 degrees, 45 degrees, 60 degrees, 90 degrees, 120 degrees, 240 degrees, and 300 degrees, for example.

As illustrated in FIG. 5, the relative displacement mechanism 90 is located downstream of the worm gear 67 in the power transmission direction in the power transmission path of the power transmission unit 62 where the driving force of the motor 61 is transmitted. In view of this, even when the worm gear 67 is locked due to its locking function, the pinion 71 can idle with respect to the rotation shaft 69, and thus the carriage body 42 can be displaced upward.

Figure 8:
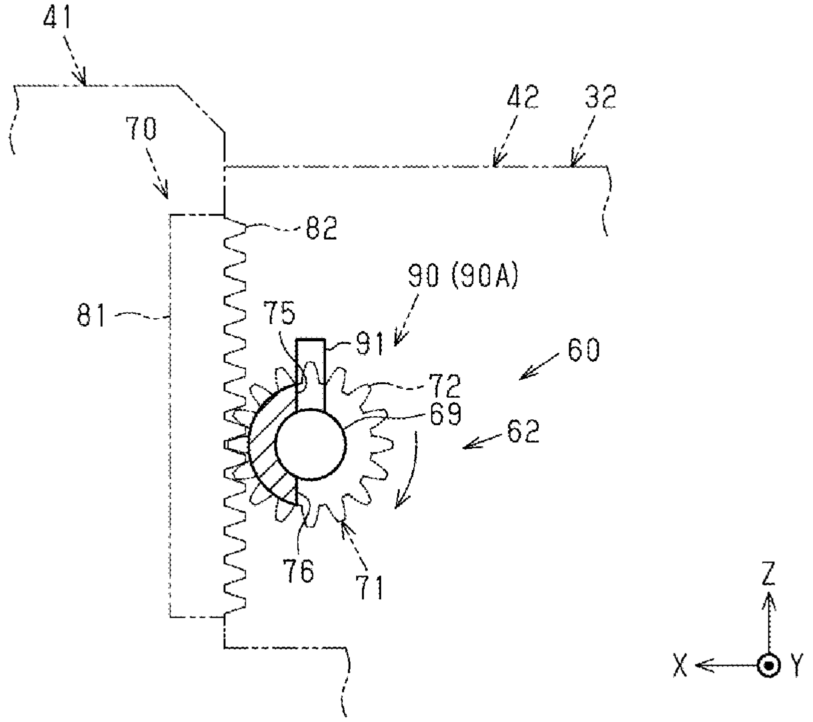
FIG. 8 is a perspective view illustrating a rack-and-pinion mechanism including the idling mechanism with no thrusting force.
Figure 9:
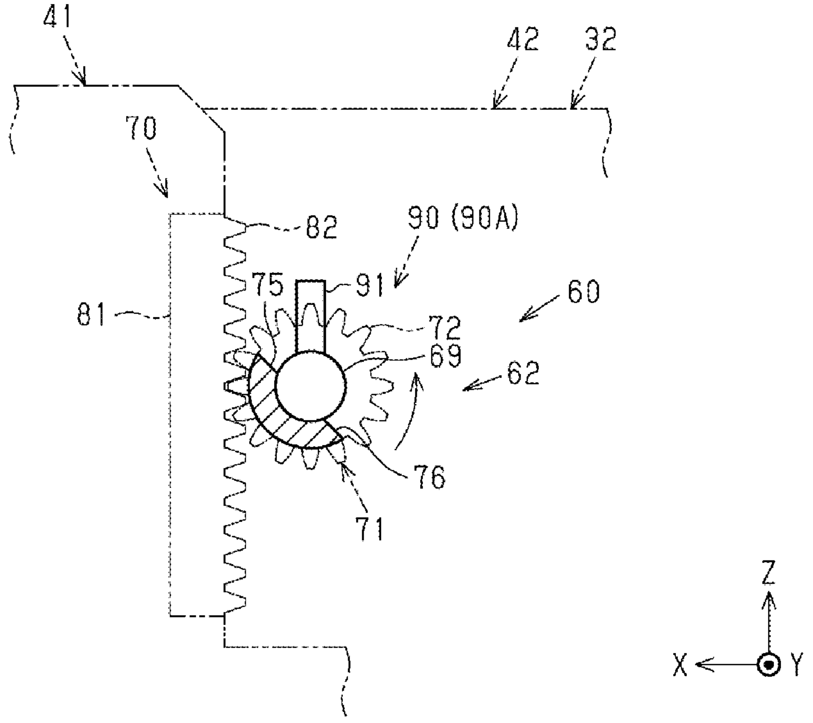
FIG. 9 is a perspective view illustrating the rack-and-pinion mechanism including the idling mechanism with a thrusting force.

As illustrated in FIG. 8, normally, the pinion 71 is rotated in the arrow direction in FIG. 8 due to the own weight of the carriage body 42, with the first regulation surface 75 in contact with the pin 91. As illustrated in FIG. 9, when a thrusting force of the foreign object acts on the carriage body 42 in this normal state, the pinion 71 idles with respect to the rotation shaft 69 in the arrow direction in FIG. 9, and the pinion 71 moves upward through engagement with the rack 81. In this manner, the carriage body 42 is displaced upward with respect to the carriage guide 41. That is, even when the printing head 31 hits against the foreign object such as the medium M of a jam during the printing and receives a thrusting force from the foreign object, the carriage body 42 can escape upward through the idling of the pinion 71 of the idling mechanism 90A.

Electrical Configuration of Printing Apparatus 11

Next, an electrical configuration of the printing apparatus 11 is described with reference to FIG. 10.

Figure 10:
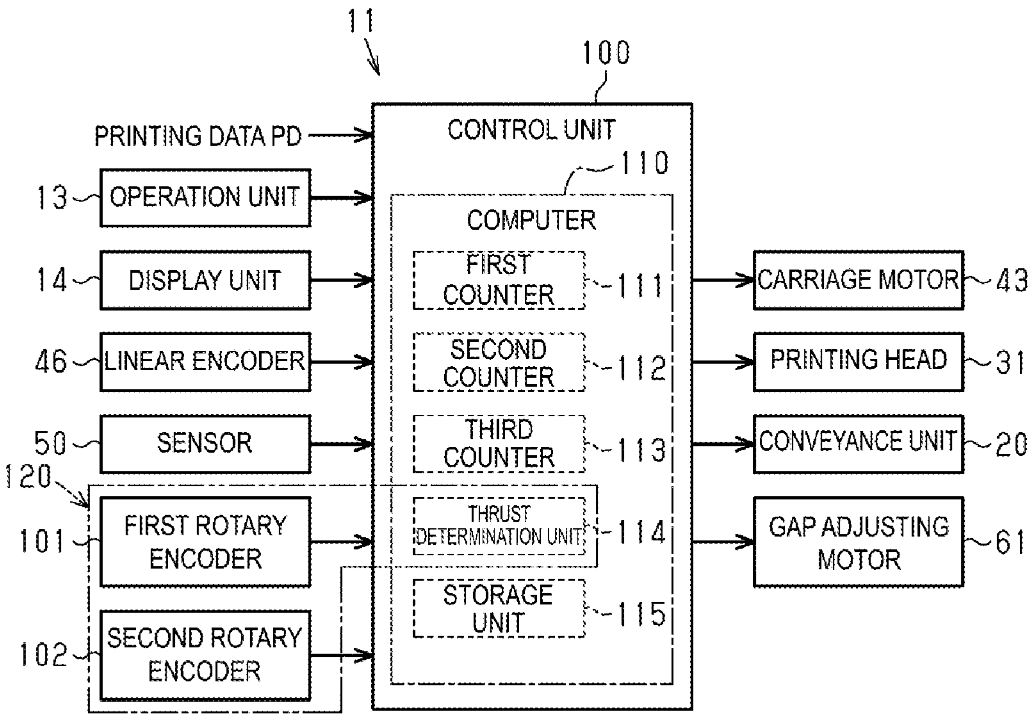
FIG. 10 is a block diagram illustrating an electrical configuration of a printing apparatus.

As illustrated in FIG. 10, the printing apparatus 11 includes the above-described control unit 100. The control unit 100 may be configured to as a circuit including α: one or more processors that execute various processes in accordance with a computer program, β: one or more dedicated hardware circuits that execute at least some of various processes, or γ: a combination of them. The hardware circuit is an application-specific integrated circuit, for example. The processor includes a CPU, and a memory such as RAM and ROM, and the memory stores program codes or commands configured to cause the CPU to execute processes. The memory, i.e., a computer readable medium, includes all types of readable media that are accessible from general-purpose or dedicated computers.

The operation unit 13, the display unit 14, a linear encoder 46, and the sensor 50 are electrically coupled to the control unit 100 as the input system. A first rotary encoder 101 as an example of the first detection unit, and a second rotary encoder 102 as an example of the second detection unit may be electrically coupled to the control unit 100.

The operation unit 13 is operated by the user to provide an instruction to the printing apparatus 11. The control unit 100 inputs an operation signal based on the user operation from the operation unit 13. The display unit 14 displays various menu screens and the like. In the case where the display unit 14 is composed of a touch panel, its touch operation function may be configured as at least a part of the operation unit 13, for example. In addition, the display unit 14 also has a function of displaying to the user a notification of information indicating occurrence of abnormality. When detecting a jam, the control unit 100 displays on the display unit 14 notification information such as messages indicating occurrence of a jam and requesting a jam removal operation, for example.

The linear encoder 46 includes an optical sensor (not illustrated) attached to the carriage 32, and a linear scale 47 extended along the movement path of the carriage 32 (see FIG. 3). The optical sensor generates pulses when it detects light emitted from a light projector not illustrated in the drawing and passed through optically transparent parts provided at a constant pitch at the linear scale 47. The linear encoder 46 outputs a detection signal including a number of pulses proportional to the movement amount of the carriage 32.

In addition, the sensor 50 detects a hit of the printing head 31 against the foreign object. The sensor 50 is provided at the nozzle surface 31A of the printing head 31. The sensor 50 may be a detection unit that detects one of thrusting force, pressure, and distortion received at the nozzle surface 31A when the foreign object hits against the nozzle surface 31A. That is, the sensor 50 may be any one of an impact sensor, a pressure sensor, and a deformation sensor.

In addition, the first rotary encoder 101 detects the rotation of the gap adjusting motor 61. The first rotary encoder 101 outputs a first detection signal containing a number of pulses proportional to the rotation amount of the gap adjusting motor 61.

In addition, the second rotary encoder 102 detects the rotation of the pinion 71 making up the idling mechanism 90A. The second rotary encoder 102 outputs a second detection signal containing a number of pulses proportional to the rotation amount of the pinion 71.

In addition, as illustrated in FIG. 10, the carriage motor 43, the printing head 31, the conveyance unit 20 and the gap adjusting motor 61 are electrically coupled to the control unit 100 as the output system.

The control unit 100 moves the carriage 32 in the scanning direction X by driving and controlling the carriage motor 43. During the printing, the control unit 100 moves the carriage 32 back and forth in the scanning direction X by driving the carriage motor 43 forward/backward.

The control unit 100 performs an ejecting control of the printing head 31. The control unit 100 performs the ejecting control of the printing head 31 based on image data included in printing data PD.

The control unit 100 controls the conveyance unit 20. A plurality of motors including the conveyance motor 26 making up the conveyance unit 20 is electrically coupled to the control unit 100. The control unit 100 controls each of the plurality of motors including the conveyance motor 26 to perform the conveyance control of the medium M.

The control unit 100 performs the printing control to perform printing on the medium M by controlling the conveyance unit 20, the carriage motor 43 and the printing head 31 on the basis of the input printing data PD. The printing data PD includes a printing command, printing condition information and image data. The printing condition information includes the type and size of medium, color/monochrome printing modes and the like. Images and the like are printed on the medium M by alternately performing a conveyance operation of conveying the medium M to the next conveyance position with the conveyance unit 20, and a printing operation of performing printing by one scanning with the printing head 31 in the process of moving the carriage 32 one time in the scanning direction X.

When the printing data PD is input, the control unit 100 controls the gap adjusting motor 61 to adjust the gap GP in accordance with the medium type in the printing condition information. The control unit 100 adjusts the gap GP between the conveyance belt 21 and the printing head 31 by adjusting the height position of the carriage body 42 with respect to the carriage guide 41 by controlling the gap adjusting motor 61.

The control unit 100 includes a computer 110. The computer 110 includes a first counter 111, a second counter 112 and a third counter 113. Further, the computer 110 includes a thrust determination unit 114 and a storage unit 115. The storage unit 115 stores a program and the like. The thrust determination unit 114 may be composed of software constructed by executing a program by the computer 110, or hardware composed of an electronic circuit such as an ASIC. Further, the thrust determination unit 114 may be configured by the collaboration of software and hardware.

The first counter 111 counts a value representing the position (carriage position) of the carriage 32 in the scanning direction X by counting the number of input pulses or pulse edges from the linear encoder 46. For example, when the carriage 32 located at the home position is detected, the first counter 111 is reset and then the number of input pulses or the number of pulse edges from the linear encoder 46 is counted. The count value of the first counter 111 represents the carriage position of which the origin position is the position where the carriage 32 is located at the home position. The control unit 100 recognizes the carriage position from the count value of the first counter 111.

The second counter 112 counts the value representing the gap GP by counting the number of input pulses or pulse edges from the first rotary encoder 101. For example, when the carriage 32 located at the reference position of the gap GP is detected, the second counter 112 is reset and then the number of input pulses or pulse edges from the first rotary encoder 101 is counted. The count value of the second counter 112 represents the size of the gap GP or the height position of the carriage body 42. The control unit 100 recognizes the gap GP or the height position of the carriage 32 from the count value of the second counter 112.

The third counter 113 counts the value representing the rotation position of the pinion 71 making up the idling mechanism 90A by counting the number of input pulses or pulse edges from the second rotary encoder 102. For example, when the regulation surface 75 of the pinion 71 is in contact with the pin 91 and it is detected as being at the reference position of the gap GP, the third counter 113 is reset. Thereafter, the third counter 113 counts the number of input pulses or pulse edges from the second rotary encoder 102. The count value of the third counter 113 represents the rotation position of the pinion 71. The control unit 100 recognizes the rotation position of the pinion 71 from the count value of the third counter 113.

The thrust determination unit 114 determines the presence/absence of thrust displacement of the carriage 32. The thrust determination unit 114 compares the count value of the second counter 112 with the count value of the third counter 113. Here, normally, the pinion 71 rotates while maintaining the state where the first regulation surface 75 is in contact with the pin 91. In this state, the ratio between the rotation amount of the gap adjusting motor 61 and the rotation amount of the pinion 71 is constant. In this manner, a certain correspondence relationship is established between the count value of the second counter 112 and the count value of the third counter 113. On the other hand, when thrust displacement of the carriage 32 occurs, the pinion 71 idles, and consequently a constant ratio match between the rotation amount of the motor 61 and the rotation amount of the pinion 71 is lost. The thrust determination unit 114 determines whether a difference exceeding a threshold value is caused in the correspondence relationship of the values of the second counter 112 and the third counter 113, and determines that thrust displacement of the carriage 32 has occurred when a difference exceeding the threshold value is caused. Note that a thrust detection unit 120 is composed of the first rotary encoder 101, the second rotary encoder 102, the thrust determination unit 114 and the like.

Operations of Embodiment

Next, operations of the printing apparatus 11 of this embodiment are described. The control unit 100 acquires medium type information in the printing condition information included in the printing data PD. The medium type information is information representing the type of the medium M such as plain paper, gloss paper, photograph paper, and postcard. Here, when the type of the medium M is determined, the thickness of the medium M is determined. The control unit 100 adjusts the gap GP to a gap corresponding to the thickness of the medium M determined from the type of the medium M by controlling the motor 61 of the gap adjusting unit 60.

When the motor 61 is driven forward, the printing head 31 moves up together with the carriage body 42. In this manner, the gap GP increases. On the other hand, when the motor 61 is driven backward, the printing head 31 moves down together with the carriage body 42. In this manner, the gap GP decreases. In this manner, the gap GP is adjusted to a gap corresponding to the type (thickness) of the medium M.

In this embodiment, since the power transmission unit 62 includes the worm gear 67, the locking function of the worm gear 67 can maintain the carriage 32 at the height position set in the gap adjustment even when the motor 61 is stopped. In this manner, the power consumption of the gap adjusting unit 60 is reduced in comparison with the configuration in which the driving force (torque) of the motor 61 maintains the carriage body 42 at the target height position corresponding to the gap GP.

When the gap GP is adjusted, the control unit 100 performs printing of letters or images based on image data on the medium M by controlling the conveyance unit 20, the carriage motor 43 and the printing head 31 on the basis of the printing data PD.

During the printing, if there is an object on the movement path of the printing head 31 for occurrence of a jam with the medium M or other reasons, such an object may become a foreign object that can hit against the printing head 31 during the printing. When the printing head 31 hits against the foreign object in the process of moving the carriage 32 in the scanning direction X, the sensor 50 provided at the nozzle surface 31A detects that the printing head 31 has hit against the foreign object. In this case, even when the control unit 100 stops the driving of the carriage motor 43 on the basis of the detection result of the sensor 50, the printing head 31 may receive an impact force in the thrust direction from the foreign object before the carriage 32 stops, and the excessive impact force from the foreign object may not be avoided in time.

However, in this embodiment, when the carriage body 42 receives the thrusting force, the idling mechanism 90A idles (relatively rotates) the pinion 71 such that the carriage body 42 can escape upward. As a result, failures caused by damage to the printing head 31 due to the thrusting force from the foreign object are avoided. In addition, failures of the gap adjusting unit 60 due to the worm gear 67 of the power transmission unit 62 directly receiving the thrusting force are avoided.

Note that it is possible to adopt a configuration in which the thrust detection unit 120 additionally detects thrust displacement of the carriage body 42 in place of or in addition to the sensor 50. In this case, when the thrust detection unit 120 detects thrust displacement of the carriage 32, the control unit 100 stops the driving of the carriage motor 43. Thus, also in this case the carriage 32 can be stopped when the printing head 31 hits against the foreign object during the printing. For example, when stopping the carriage 32 on the basis of the detection result of the sensor 50, the carriage 32 may be stopped on the basis of the detection result of the thrust detection unit 120 in some cases even in the case where the carriage 32 cannot be stopped in time after the detection of a hit of the foreign object against the nozzle surface 31A due to speedup of the carriage 32. In addition, the thrusting force exerted on the sensor 50 may be relatively reduced with the carriage 32 escaping upward. In this case, detection omission may occur. Even if there is detection omission, the carriage 32 can be more reliably stopped on the basis of the detection result of the thrust detection unit 120.

According to this embodiment, the following effects can be obtained.

(1) The printing apparatus 11 includes the conveyance belt 21 as an example of the supporting part that supports the medium M, the carriage 32 in which the printing head 31 is disposed, and the gap adjusting unit 60 that adjusts the gap GP between the conveyance belt 21 and the printing head 31. The printing head 31 performs recording on the medium M supported by the conveyance belt 21. The gap adjusting unit 60 includes the gap adjusting motor 61 as an example of the driving unit, the power transmission unit 62 including the rotation shaft 69 that rotates with the driving force of the motor 61, the lifting unit 70, and the relative displacement mechanism 90. The lifting unit 70 moves up and down the carriage 32 with the rotational force of the rotation shaft 69 transmitted by the power transmission unit 62. Of two members making up at least one of the power transmission unit 62 or the lifting unit 70 and making contact with each other, the relative displacement mechanism 90 relatively displaces one member in a direction of allowing the upward displacement of the carriage 32 with respect to the other member in an operation stop state. Note that the upward displacement of the carriage 32 is displacement of the carriage 32 in an upward direction.

With this configuration, the driving force of the motor 61 the is output as the rotation of the rotation shaft 69 through the power transmission unit 62. The lifting unit 70 moves up and down the carriage 32 with the rotation of the rotation shaft 69. In this manner, the gap GP between the printing head 31 and the supporting part is adjusted. When the carriage 32 hits against a foreign object on a movement path (e.g., a medium and the like at occurrence of jam) and the like, a thrusting force as an external force in a direction moving up the carriage 32 is applied to the carriage 32. When the thrusting force is applied, the relative displacement mechanism 90 relatively displaces one of the two members with the other still set to an operation stop state. Through this relative displacement, the upward displacement of the carriage 32 is allowed without moving the power transmission unit 62 and the lifting unit 70. In this manner, the carriage 32 can escape upward when the printing head 31 receives the thrusting force of the foreign object. Thus, the damage to the printing head 31 due to a hit against the foreign object can be suppressed. Here, examples of the damage that can be suppressed include damages to the printing head 31 or damages to the gap adjusting unit 60.

(2) The relative displacement mechanism 90 is the idling mechanism 90A that uses an idling of one of two members as relative displacement. With this configuration, when the printing head 31 hits against a foreign object, one of two members idles to allow the upward movement of the carriage 32. Thus, the damage to the printing head 31 due to a hit against the foreign object can be suppressed.

(3) One of the two members is the pinion 71 as an example of the gear, and the other is the rotation shaft 69 that relatively rotatably supports the pinion 71. The relative displacement mechanism 90 is the idling mechanism 90A that idles the pinion 71 with respect to the rotation shaft 69. With this configuration, when the printing head 31 hits against a foreign object, the carriage 32 receives a thrusting force. With this thrusting force, the pinion 71 idles with respect to the rotation shaft 69, and the carriage 32 can escape to the upper side. Thus, the damage to the printing head 31 due to a hit against the foreign object can be suppressed.

(4) The idling mechanism 90A includes the pin 91 extending in the radial direction from the rotation shaft 69, and the pinion 71 disposed in a relatively rotatable manner with respect to the rotation shaft 69. The pinion 71 includes the regulation surfaces 75 and 76 that regulate the idling range by making contact with the pin 91. With this configuration, the pinion 71 is in the state where the regulation surface 75 is in contact with the pin 91 with the own weight of the carriage 32. With the thrusting force that is received by the carriage 32 when the printing head 31 hits against the foreign object, the pinion 71 idles in the direction in which the regulation surface 75 goes away from the pin 91. In this manner, the carriage 32 can escape to the upper side. Thus, the damage to the printing head 31 due to a hit against the foreign object can be suppressed.

(5) The power transmission unit 62 includes the worm gear 67. The relative displacement mechanism 90 is located downstream of the worm gear 67 in the power transmission direction in the power transmission path of the power transmission unit 62 through which the driving force of the motor 61 is transmitted. With this configuration, when the printing head 31 hits against a foreign object and a thrusting force is generated at the carriage 32, the upward movement of the carriage 32 is allowed even when locked with the worm gear 67. Thus, the damage to the printing head 31 due to a hit against the foreign object can be suppressed.

(6) The lifting unit 70 includes the pinion 71 and the rack 81. The relative displacement mechanism 90 allows the idling of the pinion 71 or the upward sliding of the rack 81 as the relative displacement. With this configuration, when the printing head 31 hits against a foreign object and a thrusting force is generated at the carriage 32, the relative displacement mechanism 90 allows the idling of the pinion 71 or the upward sliding of the rack 81 as the relative displacement. Thus, the damage to the printing head 31 due to a hit against the foreign object can be suppressed.

(7) The printing apparatus 11 includes the thrust detection unit 120 that detects the thrust displacement of the carriage 32 when the printing head 31 hits against a foreign object, and the control unit 100 that controls the printing head 31 and the carriage 32. When thrust displacement is detected during the movement of the carriage 32, the control unit 100 stops the carriage 32. With this configuration, when the printing head 31 hits against a foreign object, the displacement of the carriage 32 is detected by the thrust detection unit 120.

(8) The thrust detection unit 120 includes the first rotary encoder 101 as an example of the first detection unit that detects the driving amount of the motor 61, the second rotary encoder 102 as an example of the second detection unit that detects the relative displacement amount of the relative displacement mechanism 90, and the thrust determination unit 114. The thrust determination unit 114 determines that thrust displacement has occurred when the driving amount detected by the first rotary encoder 101 and the relative displacement amount detected by the second rotary encoder 102 exceed a threshold value and become inconsistent. With this configuration, when the driving amount detected by the first rotary encoder 101 and the relative displacement amount detected by the second rotary encoder 102 exceed a threshold value and become inconsistent, the thrust determination unit 114 determines that thrust displacement has occurred. In this manner, thrust displacement of the carriage 32 can be detected. Thus, a control of stopping the carriage 32 when thrust displacement of the carriage 32 is detected can be achieved.

(9) The printing apparatus 11 includes the sensor 50 that detects the foreign object that has hit against a printing head 31 during movement of the carriage 32. The control unit 100 stops the movement of the carriage 32 when the sensor 50 detects a foreign object. With this configuration, when the sensor 50 detects that the printing head 31 has hit against a foreign object during movement of the carriage 32, the carriage 32 is stopped. Thus, damage due to the hit of the printing head 31 against the foreign object can be further suppressed.

The above embodiment can also be modified as shown in the following modified examples. Furthermore, the above embodiment and the following modified examples may be combined as appropriate as further modified examples, or the following modified examples may be combined as appropriate as further modified examples.

Figure 11:
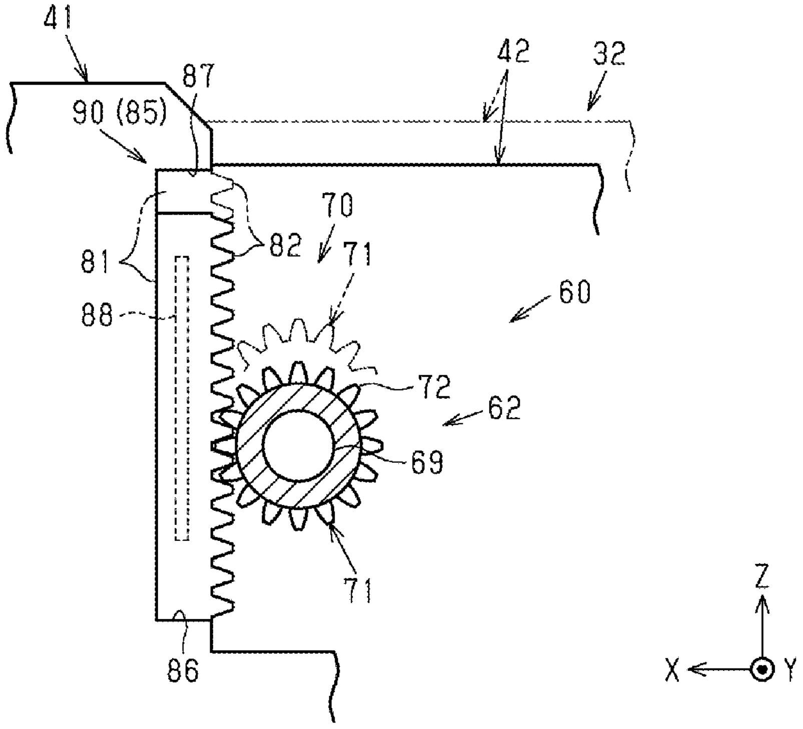
FIG. 11 is a schematic side view illustrating a slide mechanism of a modification.

The relative displacement mechanism 90 is not limited to the idling mechanism 90A. The relative displacement mechanism 90 may use not only idling, but also sliding as the relative displacement. For example, as illustrated in FIG. 11, the relative displacement mechanism 90 may be a slide mechanism 85 that allows sliding of the rack 81 in the upward direction (+Z direction) with respect to the carriage guide 41. The rack 81 is configured to be relatively movable in the vertical direction Z by being guided by a rail 88 with respect to the carriage guide 41. The rack 81 is configured to be slidable in the up/down direction with respect to the carriage guide 41 between a lower limit position where its bottom surface makes contact with a regulation surface 86, and an upper limit position where its upper surface makes contact with a regulation surface 87. Normally, the rack 81 is in the state where the bottom surface is in contact with the regulation surface 86 by its own weight. When the thrusting force of the hit of the printing head 31 against the foreign object acts on the carriage 32, the rack 81 slides upward with respect to the carriage guide 41 while maintaining the engagement position of the pinion 71 and the rack 81, and thus the carriage body 42 is relatively displaced upward by the same amount as the sliding amount. That is, the carriage 32 can escape upward when the printing head 31 hits against the foreign object. In this manner, when the printing head 31 hits against the foreign object, one of two members slides to allow the upward movement of the carriage 32. Thus, damages to the printing head 31 can be suppressed. Note that the two members are the pinion 71 and the rack 81, and one (the rack 81) of the two members slides while maintaining the engagement position of the two members.

The sensor 50 that detects the hit of the printing head 31 against a foreign object may be omitted. For example, it is possible to adopt a configuration in which the thrust detection unit 120 detects the hit of the printing head 31 against a foreign object in place of the sensor 50.

The relative displacement mechanism 90 (e.g., the idling mechanism 90A) is not limited to the configuration of idling the pinion 71. It is possible to adopt a mechanism of idling one of two members located downstream of the worm gear 67 in the power transmission path, with respect to the other member. In this case, two members are both members making up the power transmission unit 62. For example, the two members may be the second gear 68 and the rotation shaft 69. The idling mechanism 90A is configured with the second gear 68 provided in a relatively rotatable manner with respect to the rotation shaft 69. In the idling mechanism 90A, the rotation shaft 69 idles together with the pinion 71 with respect to the second gear 68 while maintaining the engagement position of the worm gear 67 and the second gear 68. The idling mechanism 90A includes a pin extending in the radial direction from the second rotation shaft 69, and the two regulation surfaces of the second gear 68. The second rotation shaft 69 can idle within the idling range up to the hit of the pin rotating together against the regulation surfaces of the second gear 68 on both sides in the circumferential direction. The pinion 71 can rotate when the second rotation shaft 69 rotates, and thus the carriage body 42 can escape upward through the engagement of the pinion 71 and the rack 81.

The idling mechanism 90A is not limited to the configuration provided with the pin 91 and the regulation surfaces 75 and 76. For example, in place of the pin 91, a protrusion provided upright at the second rotation shaft 69 and configured to be able to make contact with the regulation surfaces 75 and 76 of the pinion 71.

The lifting unit 70 may be a ball screw mechanism in place of the rack-and-pinion mechanism. The ball screw mechanism includes a ball screw shaft provided at the back surface of the carriage body 42, and a slider that engages with the ball screw shaft in a movable manner in the axis direction (the vertical direction Z), for example. A slide member that is slidable (relatively displaceable) in the elevating direction of the carriage body 42 with respect to the slider is provided, and the carriage guide 41 is fixed to the slide member. The slide member may be a rail member that guides the slider to slide upward. In this case, the two members are the slider and the slide member making up the ball screw mechanism, and the slide member is attached to the slider in a slidable manner in the vertical direction Z. In a normal state, the slider is in contact with the regulation surface of the slide member by the own weight of the carriage body 42. When the carriage body 42 receives a thrusting force, the slider is displaced upward with respect to the slide member. Even with this configuration, when the printing head 31 hits against a foreign object, the slider of the ball screw mechanism slides upward with respect to the slide member, and thus the carriage body 42 can escape upward.

The motor 61 may be energized to maintain the carriage body 42 at the height position corresponding to the gap GP. In this case, the power transmission unit 62 may not include the worm gear 67. This configuration can also allow the carriage 32 to move upward when the printing head 31 hits against the foreign object.

A friction inhibitor such as grease may be applied or injected between the pinion 71 and the rotation shaft 69.

The parts of the regulation surfaces 75 and 76 where the pin 91 hits in the pinion 71 may be hardened by quenching.

The supporting part may be a square plate-shaped or cylindrical shaped support base (e.g., a platen) in place of the conveyance belt 21. The square plate-shaped support base may have a configuration provided with a plurality of projecting ribs for supporting the medium M at the top surface, for example. Further, the supporting part may be a table that supports the medium M. The table may be a movable table that can move the position of the medium M with respect to the printing head 31.

The printing apparatus 11 is not limited to the textile printing apparatus that performs printing on the medium M such as fabric, but may be an apparatus that performs printing on the medium M such as single sheet paper and roll paper.

The printing apparatus 11 is not limited to a serial printer. The printing apparatus 11 may be a lateral printer provided with the printing head 31 movable in two directions, the scanning direction X and the conveyance direction Y. Even with the lateral printer, the carriage 32 can escape upward when the printing head 31 hits against the foreign object, and thus damages to the printing head 31 can be suppressed.

The printing apparatus 11 is not limited to the ink-jet printer. For example, dot impact printers, heat-sensitive printers and the like may be adopted.

The printing apparatus 11 is not limited to a large format printer configured to be able to perform printing on a large-sized medium M, but may be an office or personal printers configured to print on a relatively small-sized media M with a maximum size of A3 size or smaller.

The printing apparatus 11 may be a multifunctional device provided with a scanner (image reading unit).

In the following, the technical ideas derived from the embodiments and modifications are described with their effects.

(A) A printing apparatus includes a supporting part configured to support a medium, a carriage in which a printing head configured to perform printing on the medium supported by the supporting part is disposed, and a gap adjusting unit configured to adjust a gap between the supporting part and the printing head. The gap adjusting unit includes a driving unit, a power transmission unit including a rotation shaft configured to rotate with a driving force of the driving unit, a lifting unit configured to move the carriage up and down with a rotational force of the rotation shaft transmitted by the power transmission unit, and a relative displacement mechanism configured to relatively displace one of two members in a direction of allowing an upward displacement of the carriage with respect to the other of the two members that is in an operation stop state, the two members being members making up at least one of the power transmission unit or the lifting unit and making contact with each other.

With this configuration, the driving force of the driving unit is output as the rotation of the rotation shaft through the power transmission unit. The lifting unit moves up the carriage with the rotation of the rotation shaft. In this manner, the gap between the printing head and the supporting part is adjusted. When the printing head hits against a foreign object on a movement path (e.g., a medium and the like at occurrence of jam) and the like, a thrusting force as an external force in a direction moving up the carriage is applied to the carriage. When the external force in the direction of moving up the carriage is applied, one of the two members is relatively displaced with the relative displacement mechanism with the other still set to an operation stop state. This relative displacement allows the upward displacement (in the upward direction) of the carriage. Thus, the carriage can escape upward when the printing head receives the thrusting force of the foreign object. In this manner, damages due to a hit of the printing head against the foreign object can be suppressed.

(B) In the printing apparatus according to (A), the relative displacement mechanism may use idling or sliding of the one of the two members as relative displacement.

With this configuration, the carriage receives a thrusting force when the printing head hits against a foreign object. With this thrusting force, one of the two members idles or slides, and thus the carriage can escape to the upper side. The upward movement of the carriage is allowed. Thus, damages due to a hit of the printing head against the foreign object can be suppressed.

(C) In the printing apparatus according to (B), the one of the two members may be a gear, the other of the two members may be a rotation shaft configured to support the gear in a relatively rotatable manner, and the relative displacement mechanism may be an idling mechanism configured to idle the gear with respect to the rotation shaft.

With this configuration, the carriage receives a thrusting force when the printing head hits against a foreign object. With this thrusting force, the gear idles with respect to the rotation shaft, and thus the carriage can escape to the upper side. Thus, damages due to a hit of the printing head against the foreign object can be suppressed.

(D) In the printing apparatus according to (C), the idling mechanism may include a pin extending in a radial direction from the rotation shaft, and the gear disposed in a relatively rotatable manner with respect to the rotation shaft and including a regulation surface configured to regulate an idling range of the gear by making contact with the pin.

With this configuration, the gear is in the state where its regulation surface is in contact with the pin by the own weight of the carriage. With the thrusting force received by the carriage when the printing head hits against the foreign object, the gear idles in the direction in which the regulation surface goes away from the pin. In this manner, carriage can escape to the upper side. Thus, damages due to a hit of the printing head against the foreign object can be suppressed.

(E) In the printing apparatus according to any one of (A) to (D), the power transmission unit may include a worm gear, and the relative displacement mechanism may be located downstream of the worm gear in a power transmission direction in a power transmission path of the power transmission unit through which a driving force of the driving unit is transmitted.

With this configuration, when the printing head hits against a foreign object and a thrusting force is generated at the carriage, the upward movement of the carriage is allowed even when locked with the worm gear. Thus, damages due to a hit of the printing head against the foreign object can be suppressed.

(F) In the printing apparatus according to any one of (A) to (E), the lifting unit may include a pinion and a rack, and the relative displacement mechanism may allow idling of the pinion or upward sliding of the rack as relative displacement.

With this configuration, when the printing head hits against a foreign object and a thrusting force is generated at the carriage, the relative displacement mechanism allows the idling of the pinion or the upward sliding of the rack as the relative displacement. Thus, damages due to a hit of the printing head against the foreign object can be suppressed.

(G) The printing apparatus according to any one of (A) to (F) may include a thrust detection unit configured to detect thrust displacement of the carriage when the printing head hits against a foreign object, and a control unit configured to control the printing head and the carriage. When the thrust displacement is detected during movement of the carriage, the control unit stops the carriage.

With this configuration, when the printing head hits against the foreign object, the displacement of the carriage is detected by the thrust detection unit. When thrust displacement is detected during the movement of the carriage, the carriage is stopped. Thus, damages due to a hit of the printing head against the foreign object can be further suppressed.

(H) In the printing apparatus according to (G), the thrust detection unit may include a first detection unit configured to detect a driving amount of the driving unit, a second detection unit configured to detect a relative displacement amount of the relative displacement mechanism, and a thrust determination unit configured to determine occurrence of the thrust displacement when the driving amount detected by the first detection unit and the relative displacement amount detected by the second detection unit exceed a threshold value and become inconsistent.

With this configuration, when the driving amount detected by the first detection unit and the relative displacement amount detected by the second detection unit exceed the threshold value and become inconsistent, the thrust determination unit determines that thrust displacement has occurred, and thus thrust displacement of the carriage can be detected. Thus, the control of stopping the carriage when thrust displacement of the carriage is detected can be achieved.

What is claimed is:

1. A printing apparatus, comprising:

a supporting part configured to support a medium;

a carriage at which a printing head configured to perform printing on the medium supported by the supporting part is disposed; and a gap adjusting unit configured to adjust a gap between the supporting part and the printing head, wherein the gap adjusting unit includes:

a driving unit;

a power transmission unit including a rotation shaft configured to rotate with a driving force of the driving unit;

a lifting unit configured to move the carriage up and down with a rotational force of the rotation shaft, transmitted by the power transmission unit; and a relative displacement mechanism configured to relatively displace one of two members in a direction of allowing an upward displacement of the carriage with respect to the other of the two members that is in an operation stop state, the two members being members making up at least one of the power transmission unit or the lifting unit and making contact with each other, wherein the one of the two members is a gear, the other of the two members is a rotation shaft configured to support the gear in a relatively rotatable manner, and the relative displacement mechanism is an idling mechanism configured to idle the gear with respect to the rotation shaft.

2. The printing apparatus according to claim 1, wherein the idling mechanism includes:

a pin extending in a radial direction from the rotation shaft; and the gear disposed in a relatively rotatable manner with respect to the rotation shaft and including a regulation surface configured to regulate an idling range of the gear by making contact with the pin.

3. The printing apparatus according to claim 1, wherein the power transmission unit includes a worm gear, and the relative displacement mechanism is located downstream of the worm gear in a power transmission direction in a power transmission path of the power transmission unit through which a driving force of the driving unit is transmitted.

4. The printing apparatus according to claim 1, wherein the lifting unit includes a pinion and a rack, and the relative displacement mechanism allows idling of the pinion or upward sliding of the rack as relative displacement.

5. The printing apparatus according to claim 1, comprising:

a thrust detection unit configured to detect thrust displacement of the carriage when the printing head hits against a foreign object; and a control unit configured to control the printing head and the carriage, wherein when the thrust displacement is detected during movement of the carriage, the control unit stops the carriage.

6. The printing apparatus according to claim 5, wherein the thrust detection unit includes:

a first detection unit configured to detect a driving amount of the driving unit;

a second detection unit configured to detect a relative displacement amount of the relative displacement mechanism; and a thrust determination unit configured to determine occurrence of the thrust displacement when the driving amount detected by the first detection unit and the relative displacement amount detected by the second detection unit exceed a threshold value and become inconsistent.

7. A printing apparatus, comprising:

a supporting part configured to support a medium;

a carriage at which a printing head configured to perform printing on the medium supported by the supporting part is disposed; and a gap adjusting unit configured to adjust a gap between the supporting part and the printing head, wherein the gap adjusting unit includes:

a driving unit;

a power transmission unit including a rotation shaft configured to rotate with a driving force of the driving unit;

a lifting unit configured to move the carriage up and down with a rotational force of the rotation shaft, transmitted by the power transmission unit; and a relative displacement mechanism configured to relatively displace one of two members in a direction of allowing an upward displacement of the carriage with respect to the other of the two members that is in an operation stop state, the two members being members making up at least one of the power transmission unit or the lifting unit and making contact with each other, wherein the gap adjusting unit is attached to a portion of a surface of the carriage.

8. The printing apparatus according to claim 7, wherein the relative displacement mechanism uses idling or sliding of the one of the two members as relative displacement.

9. The printing apparatus according to claim 8, wherein the one of the two members is a gear, the other of the two members is a rotation shaft configured to support the gear in a relatively rotatable manner, and the relative displacement mechanism is an idling mechanism configured to idle the gear with respect to the rotation shaft.

10. The printing apparatus according to claim 9, wherein the idling mechanism includes:

a pin extending in a radial direction from the rotation shaft; and the gear disposed in a relatively rotatable manner with respect to the rotation shaft and including a regulation surface configured to regulate an idling range of the gear by making contact with the pin.

11. The printing apparatus according to claim 7, wherein the power transmission unit includes a worm gear, and the relative displacement mechanism is located downstream of the worm gear in a power transmission direction in a power transmission path of the power transmission unit through which a driving force of the driving unit is transmitted.

12. The printing apparatus according to claim 7, wherein the lifting unit includes a pinion and a rack, and the relative displacement mechanism allows idling of the pinion or upward sliding of the rack as relative displacement.

* * * * *